United States Patent [19]
Willis

[11] Patent Number: 5,891,323
[45] Date of Patent: Apr. 6, 1999

[54] PURIFICATION PROCESS

[75] Inventor: Edwin Stephen Willis, Northallerton, United Kingdom

[73] Assignee: Imperial Chemical Industries PLC, United Kingdom

[21] Appl. No.: 817,127

[22] PCT Filed: Sep. 26, 1995

[86] PCT No.: PCT/GB95/02276

§ 371 Date: Apr. 7, 1997

§ 102(e) Date: Apr. 7, 1997

[87] PCT Pub. No.: WO96/13326

PCT Pub. Date: May 9, 1996

[30] Foreign Application Priority Data

Oct. 27, 1994 [GB] United Kingdom .................. 9421705

[51] Int. Cl.$^6$ .................................................. C10G 25/00
[52] U.S. Cl. ........................... 208/211; 208/213; 502/34; 502/53
[58] Field of Search ................. 502/34, 53; 208/211, 208/91, 213

[56] References Cited

U.S. PATENT DOCUMENTS

| | | | |
|---|---|---|---|
| 4,661,256 | 4/1987 | Johnson | 210/634 |
| 4,952,746 | 8/1990 | Johnson | 585/802 |
| 4,978,439 | 12/1990 | Carnell et al. | 208/91 |

FOREIGN PATENT DOCUMENTS 0 329 301   8/1989   European Pat. Off. .

OTHER PUBLICATIONS

Patent Abstracts of Japan, vol. 12, No. 372 (C–533) & JP,A,63 122790 (Mitsubishi Heavy Ind.) May 26 1988, see abstract.

Patent Abstracts of Japan, vol. 17, No. 622 (C–1130) & JP,A,05 192535 (Kawasaki Heavy Ind.) Aug. 3 1993, see abstract.

*Primary Examiner*—Michael Lewis
*Assistant Examiner*—Alexander G. Ghyka

[57] ABSTRACT

Regeneration of an adsorbent bed on to which impurity compounds, e.g. sulphur compounds, have been adsorbed by means of a gas stream to desorb the impurity compounds. The gas stream containing the desorbed impurity compounds is then passed over a catalyst, e.g. a hydrodesulphurisation catalyst, effective to cause the reaction of at least some of the desorbed impurity compounds with hydrogen to give a reaction product which is then removed by absorption using a bed of non-regenerable absorbent. At least some of the gas stream is then recycled to the adsorbent bed undergoing regeneration. Hydrogen is added in approximately the stoichiometric amount required for the reaction with the impurity compounds before the regeneration gas enters the catalyst.

10 Claims, 1 Drawing Sheet

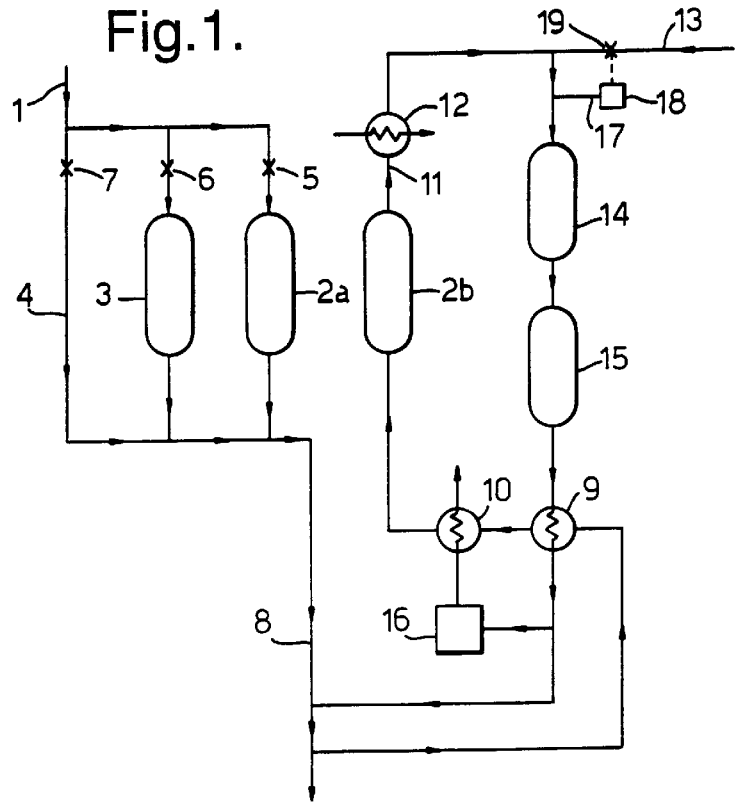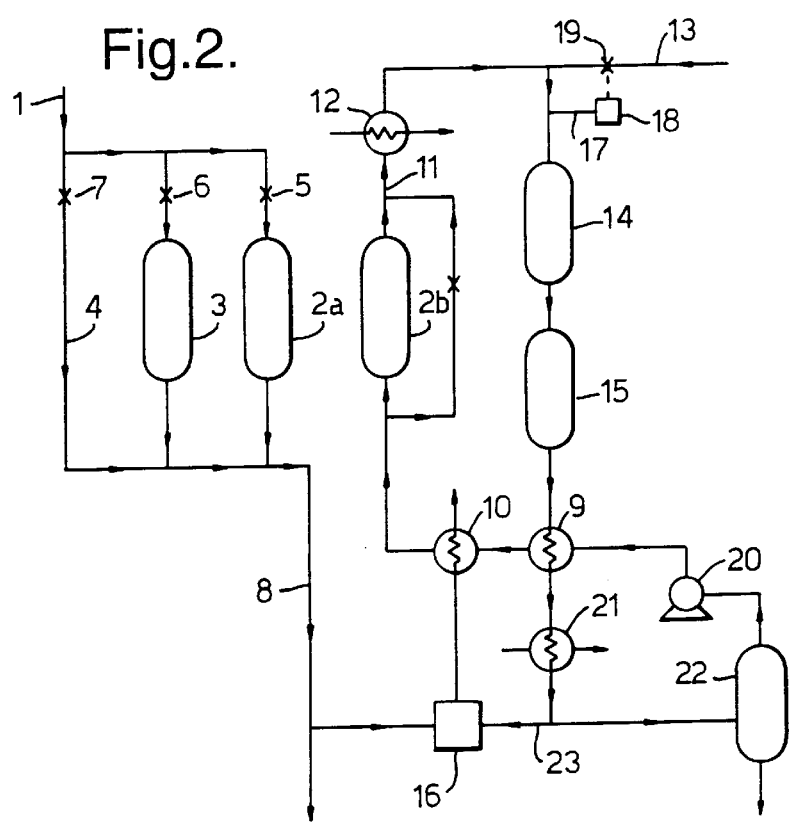

PURIFICATION PROCESS

This invention relates to a purification process and in particular to a process wherein an adsorbent bed is periodically regenerated by the passage of a heated gas therethrough.

It has been proposed in U.S. Pat. No. 4,978,439 to remove sulphur compounds from a feedstock stream by passing the feedstock through a bed of a regenerable adsorbent, such as a molecular sieve, and, while one bed is effecting adsorption of sulphur compounds from the feedstock to produce a product stream, another bed, on to which sulphur compounds such as mercaptans had been adsorbed, is undergoing regeneration by passing a heated gas stream through the bed to desorb the sulphur compounds. The effluent from the bed undergoing regeneration is then subjected to reaction with hydrogen, i.e. hydro-desulphurisation, to convert sulphur compounds desorbed during the regeneration to hydrogen sulphide, hydrogen being added to the regeneration gas before or after passage through the adsorbent bed. The effluent from the hydro-desulphurisation stage was then passed through a bed of a suitable absorbent to absorb the hydrogen sulphide. The effluent from the absorbent bed was then added to the product stream.

One disadvantage of this process is that a considerable amount of hydrogen is required since, to effect satisfactory hydro-desulphurisation, the amount of hydrogen that has to be added to the regeneration gas has to be in a substantial excess over the stoichiometric amount required for reaction with the sulphur compounds. The excess of hydrogen merely forms part of the product stream.

We have devised a process wherein this disadvantage is overcome. The process of the invention is also applicable to other purification processes where impurity compounds that react with hydrogen are adsorbed by a regenerable adsorbent. Examples of such other impurities include organo-metallic, e.g. organo-mercury, compounds and organo-chlorine compounds. Reaction of organo-mercury compounds with hydrogen give rise to mercury which can be absorbed by a suitable absorbent, such as copper sulphide. Likewise organo-chlorine compounds react with hydrogen to give hydrogen chloride which can be absorbed with a suitable alkalised absorbent material, for example granules made by agglomerating a mixture of alumina trihydrate, sodium carbonate or bicarbonate, and a binder and calcining the mixture at a temperature below 350° C.

Accordingly the present process provides a process for the regeneration of a regenerable adsorbent bed on to which impurity compounds have been adsorbed while a feedstock stream is undergoing purification to produce a product stream by passage through another bed of said regenerable adsorbent, and/or through a bed of a non-regenerable absorbent, said process comprising passing a regeneration gas stream through the bed undergoing regeneration to desorb said impurity compounds from said adsorbent and passing the effluent from that bed containing said desorbed impurity compounds over a catalyst effective to cause at least some of said impurity compounds to react with hydrogen to give a reaction product followed by absorption of said reaction product using a particulate absorbent, characterised in that the gas stream used for regeneration is circulated round a loop so that it passes through the adsorbent bed undergoing regeneration, then through a bed of said catalyst, then through a bed of absorbent for said reaction product and then returned to the bed undergoing regeneration as the regeneration gas without addition to the product stream, hydrogen being added to the circulating regeneration gas to maintain the hydrogen content at a desired level.

The invention also provides a process for the purification of a feedstock to produce a product stream comprising passing the feedstock through a first bed of regenerable adsorbent, whereby impurity compounds are adsorbed from said feedstock in said bed, periodically discontinuing flow of feedstock through said first bed and, while continuing production of said product stream by passing said feedstock through a second bed of said regenerable adsorbent, and/or through a bed of a non-regenerable absorbent, regenerating the first adsorbent bed by the aforesaid process, and, after regeneration of said first bed, resuming flow of feedstock through said first bed.

As indicated above, the process can be employed for any impurity that a) is adsorbed by a regenerable adsorbent, b) can be desorbed from the adsorbent by means of a regeneration gas stream, and c) can react with hydrogen to give a reaction product that can be absorbed by a particulate absorbent. The reaction with hydrogen may be a reduction, a hydrogenation, or a hydrogenolysis reaction. The selection of the adsorbent and absorbent materials, and the catalyst and processing conditions, will of course depend on the nature of the impurity. Where the feedstock contains more than one type of such an impurity, the regeneration loop may contain more than one catalyst and more than one particulate absorbent material. For simplicity the invention will be further described in relation to sulphur compounds as the impurities.

BRIEF DESCRIPTION OF THE DRAWINGS

The invention is illustrated by reference to the accompanying drawings wherein FIG. 1 is a flow sheet of a conventional process and FIG. 2 is a flowsheet of a process according to the invention.

In FIG. 1 a conventional process, similar to that of U.S. Pat. No. 4,978,439, is shown. A feedstock gas 1, for example natural gas, is subjected to the removal of sulphur compounds, by passage through an adsorbent bed 2$a$ containing a suitable molecular sieve, which adsorbs mercaptans from the feedstock. In parallel with the adsorbent bed 2$a$ is a bed 3 of a non-regenerable absorbent, such as a granulated copper oxide/zinc oxide/alumina composition as described in EP 0 243 052, that is effective to absorb hydrogen sulphide under the prevailing conditions. These beds 2$a$ and 3 are conveniently operated at ambient temperature and at any suitable pressure, which typically is in the range 1 to 50 bar abs., e.g. 20–40 bar abs. A bypass line 4 is also provided whereby beds 2$a$ and 3 may be bypassed. The flow of the feedstock through the beds 2$a$ and 3 and through the bypass is regulated by valves 5, 6, and 7 which are adjusted so that the product stream 8 obtained by mixing the effluents from the beds 2$a$ and 3, and any of the feedstock passing through the bypass 4, meets the desired specification for hydrogen sulphide content and total sulphur compound content.

For example a typical natural gas feedstock may have a hydrogen sulphide content of 3–4 ppm by volume and a total mercaptan and other organic sulphur compound content of 20–50 ppm by volume, and a desired product specification is less than 15 ppm by volume of total sulphur compounds and less than 1 ppm by volume of hydrogen sulphide.

While bed 2$a$ is on adsorption duty another bed 2$b$ is undergoing regeneration. This is effected by taking part of the product gas stream 8, heating it in heat exchangers 9 and 10 and passing it through bed 2$b$. The regeneration gas leaves bed 2*b* via line 11 and passed through another heat exchanger 12 to heat it to the desired hydro-desulphurisation temperature, which is typically in the range 200°–400° C. Hydrogen is then added via line 13. The mixture passed through a bed 14 of a suitable hydro-desulphurisation catalyst, e.g. nickel molybdate or cobalt molybdate. The effluent from the hydro-desulphurisation bed 14 is then passed through a bed 15 of a suitable particulate absorbent for hydrogen sulphide. A particulate, e.g. granulated, zinc oxide composition is suitable for use in this bed. The effluent from bed 15 is then passed as the heating medium through heat exchanger 9. Part of the effluent from heat exchanger 9 is used as fuel and combusted in a burner 16 to give a hot gas which is used as the heating medium for heat exchanger 10. The remainder of the effluent from heat exchanger 9 is returned to the product gas stream 8, after such compression as may be necessary (not shown). At a suitable location, especially as shown just upstream of the hydro-desulphurisation bed 14, there is positioned a probe 17 coupled to a hydrogen analysis unit 18, which in turn is coupled to a valve 19 in line 13 to control the amount of hydrogen added to the regeneration gas.

Heat exchanger 12 is required because, at the start of the regeneration, the bed 2*b* is at the relatively low temperature used for the adsorption part of the process: the hot regeneration gas from heat exchanger 10 heats the bed 2*b* to the desired regeneration temperature. During this heating, the temperature of the gas leaving bed 2*b* via line 11 gradually increases. It is likely that some sulphur compounds will be desorbed from bed 2*b* before the gas leaving bed 2*b* has a temperature high enough that effective hydro-desulphurisation will occur in bed 13. Consequently, it is necessary to provide the further heat exchanger 12 to heat the gas leaving bed 2*b* via line 11 before the gas is subjected to hydro-desulphurisation. The bed 2*b* is preferably brought to a temperature in the range 250°–350° C. to effect full regeneration.

It will be appreciated that there may be more than two beds 2*a* and 2*b*. Thus other beds may be awaiting regeneration, or held in readiness for adsorption duty, or may be undergoing cooling from the regeneration temperature down to the temperature required for adsorption duty. A bed undergoing cooling may be used for adsorption duty if some slippage of sulphur compounds into the product can be tolerated: thus while the bed is undergoing cooling duty it may be necessary to stop, or reduce the amount of, gas flowing through the bypass 4.

It will also be appreciated that it may not be necessary in some cases to have a regenerable adsorbent bed on adsorption duty while regeneration is taking place. Thus, while the regenerable adsorbent bed is undergoing regeneration, it may in some cases be possible to produce acceptable product by passing the feedstock through the non-regenerable absorbent bed. In other cases the use of a non-regenerable absorbent bed may not be necessary: in this case two or more regenerable adsorbent beds should be employed so that one can be on adsorption duty while another is undergoing regeneration.

One disadvantage of the process of this flowsheet is that in order to effect hydro-desulphurisation satisfactorily, the amount of hydrogen that has to be added via line 13 is in a substantial excess of the stoichiometric amount required and so part of this excess of hydrogen is combusted as part of the gas used to heat the heat exchanger 10 while the remainder passes into the product stream 8.

In the flow sheet of FIG. 2, the reference numerals have the same meaning as in FIG. 1. In this embodiment, which is illustrative of the invention, regeneration of bed 2*a* is effected by a circulating gas stream. A regeneration gas stream from a circulator 20 is heated in heat exchanger 9 and then further heated in heat exchanger 10 before passing through the bed 2*b* undergoing regeneration. The effluent leaving bed 2*b* via line 11 is heated as necessary in heat exchanger 12 and hydrogen added via line 13. The mixture is then passed through the bed 14 of hydro-desulphurisation catalyst, the bed 15 of particulate hydrogen sulphide absorbent, and is then used as the heating medium in heat exchanger 9. The gas leaving heat exchanger 9 is then cooled in heat exchanger 21 to condense water vapour, which is then separated as liquid in separator 22. This water results from water being desorbed from the bed 2*b* during the regeneration process and from the reaction of hydrogen sulphide with the hydrogen sulphide absorbent in bed 15. The gas from the separator is recycled to the circulator 20. A small purge may be taken from time to time at a suitable location, between, in the flow direction, bed 15 and bed 2*b*. In FIG. 2 this purge is shown as line 23. This purge, which may be continuous or intermittent, may be used as part of the fuel combusted in burner 16 used to provide the hot gas for heating heat exchanger 10. The remainder of the fuel for burner 16 may be taken from the feedstock stream or, as shown in FIG. 2, from the product stream 8.

It is seen that in the embodiment of FIG. 2, the regeneration gas is circulated round a loop. In the embodiment of FIG. 1, the purified regeneration gas from heat exchanger 9 is returned to the product gas stream 8 and part of this product gas stream is used as the fresh regeneration gas heated in heat exchanger 9. Since the fresh regeneration gas may be taken, as shown in FIG. 1, from a point in the product gas stream after return of the purified regeneration gas from heat exchanger 9, there is likewise a circulatory system. However in the embodiment of FIG. 1, the product gas from the adsorber bed 2*a* and from absorber bed 3 is added to the purified regeneration gas before the fresh regeneration gas stream is taken from the product gas. Since the fresh regeneration gas will normally be only a small proportion of the product gas, most of the regeneration gas is not recycled and so the excess of hydrogen therein is passed into the product gas stream. In the FIG. 2 embodiment in accordance with the invention there is no addition of the product gas to the regeneration gas before recycle of the latter, and so the excess of hydrogen is recycled (except for any hydrogen removed as part of the purge gas 23). Consequently the amount of hydrogen that need be added via line 13 approximates to the stoichiometric amount required for hydro-desulphurisation of the sulphur compounds desorbed from the bed 2*b*.

A bypass line controlled by a valve may be provided round the bed 2*b* in the regeneration loop so that circulation of the regeneration gas may be maintained while no bed is actually undergoing regeneration and/or to control the concentration of the sulphur compounds in the gas stream entering the hydro-desulphurisation catalyst.

It will be appreciated that there may be more than two beds 2*a* and 2*b*. Thus other beds may be awaiting regeneration, or held in readiness for adsorption duty, or may be undergoing cooling from the regeneration temperature down to the temperature required for adsorption duty. A bed undergoing cooling may be used for adsorption duty if some slippage of sulphur compounds into the product can be tolerated: thus while the bed is undergoing cooling duty it may be necessary to stop, or reduce the amount of, gas flowing through the bypass 4.

Alternatively it may not be necessary in some cases to have a regenerable adsorbent bed on adsorption duty while regeneration is taking place. Thus, while the regenerable adsorbent bed is undergoing regeneration, it may in some cases be possible to produce acceptable product by passing the feedstock through the non-regenerable absorbent bed. In other cases the use of a non-regenerable absorbent bed may not be necessary: in this case two or more regenerable adsorbent beds should be employed so that one can be on adsorption duty while another is undergoing regeneration.

As an example, it is calculated that to treat a natural gas feedstock at a rate of 120000 Nm$^3$/h containing about 35 ppm by volume of sulphur compounds, about 12000 Nm$^3$/h of regeneration gas is required. The peak sulphur compound content of the regeneration gas entering the hydro-desulphurisation catalyst bed is typically about 1% by volume and so a substantial amount of hydrogen is required to effect hydro-desulphurisation and in the flow sheet of FIG. 1 the majority of this hydrogen is wasted, i.e. it is not used in the hydro-desulphurisation step but simply forms part of the product gas stream. By utilising the process of the invention, the excess of hydrogen is recycled. It is estimated that the amount of hydrogen required to be added in the process of the invention is typically only about 4% of that required using the flowsheet of FIG. 1.

The gas used for regeneration may be part of the product gas or may be any suitable gas, such as natural gas or nitrogen. The regeneration loop may be effected at any suitable pressure, but is conveniently the pressure at which the adsorption is effected. The bed undergoing regeneration need not be a molecular sieve, but could be any regenerable adsorbent capable of adsorbing the impurity compounds.

I claim:

1. A process for the regeneration of a regenerable adsorbent bed on to which impurity compounds have been adsorbed while a feedstock stream is undergoing purification to produce a product stream by passage through another bed of said regenerable adsorbent, and/or through a bed of a non-regenerable absorbent, said process comprising passing a regeneration gas stream through the bed undergoing regeneration to desorb said impurity compounds from said adsorbent and passing the effluent from that bed containing said desorbed impurity compounds over a catalyst effective to cause at least some of said impurity compounds to react with hydrogen to give a reaction product followed by absorption of said reaction product using a particulate absorbent, characterised in that the gas stream used for regeneration is circulated round a loop so that it passes through the adsorbent bed undergoing regeneration, then through a bed of said catalyst, then through a bed of absorbent for said reaction product and then returned to the bed undergoing regeneration as the regeneration gas without addition to the product stream, hydrogen being added to the circulating regeneration gas to maintain the hydrogen content at a level that is in an excess of that required to react with the impurity compounds desorbed from the bed undergoing regeneration.

2. A process according to claim 1 wherein said impurity compounds include sulphur compounds and said catalyst is a hydro-desulphurisation catalyst effective to cause at least some of said sulphur compounds to react with hydrogen to form hydrogen sulphide as said reaction product and the hydrogen sulphide is adsorbed by said particulate absorbent.

3. A process according to claim 1 wherein a purge stream is taken from the loop and is combusted, and said regeneration gas is heated prior to passage through the bed undergoing regeneration by heat exchange with the combustion products of said purge stream.

4. A process according to claim 1 wherein said regeneration gas is heated prior to passage through the bed undergoing regeneration by heat exchange with the combustion products obtained by combusting part of the feedstock or product stream.

5. A process according to claim 1 wherein the regenerable adsorbent bed is a bed of a molecular sieve material.

6. A process for the purification of a feedstock to produce a product stream comprising passing the feedstock through a first bed of regenerable adsorbent, whereby impurity compounds are adsorbed from said feedstock in said bed, periodically discontinuing flow of feedstock through said first bed and, while continuing production of said product stream by passing said feedstock through a second bed of said regenerable adsorbent, and/or through a bed of a non-regenerable absorbent, regenerating the first adsorbent bed, and, after regeneration of said first bed, resuming flow of feedstock through said first bed, wherein the regeneration of the first adsorbent bed comprises passing a regeneration gas stream through the first adsorbent bed to desorb said impurity compounds from said adsorbent and passing the effluent from that bed containing said desorbed impurity compounds over a catalyst effective to cause at least some of said impurity compounds to react with hydrogen to give a reaction product followed by absorption of said reaction product using a particulate absorbent, and wherein the regeneration gas stream is circulated round a loop so that it passes through the first adsorbent bed, then through a bed of said catalyst, then through a bed of absorbent for said reaction product and then returned to the first adsorbent bed as the regeneration gas without addition to the product stream, hydrogen being added to the circulating regeneration gas to maintain the hydrogen content at a level that is in an excess of that required to react with the impurity compounds desorbed from the first absorbent bed.

7. A process according to claim 6 wherein said impurity compounds include sulphur compounds.

8. A process according to claim 6 wherein at least two beds of regenerable adsorbent are employed and the feedstock is passed through at least one of said beds of regenerable adsorbent while another of said beds is undergoing regeneration.

9. A process according to claim 8 wherein part of the feedstock flows through a bed of non-regenerable absorbent in parallel with the flow through the bed of regenerable adsorbent.

10. A process according to claim 6 wherein, after regeneration of the bed of regenerable adsorbent, circulation of regeneration gas round the loop is maintained by passing said regeneration gas through a line bypassing the bed that has undergone regeneration.

* * * * *